(12) United States Patent
Hu

(10) Patent No.: US 8,385,259 B2
(45) Date of Patent: Feb. 26, 2013

(54) CROSS CHANNEL COEXISTENCE BEACONING PROTOCOL FOR WIRELESS DYNAMIC SPECTRUM ACCESS NETWORKS

(75) Inventor: Wendong Hu, San Jose, CA (US)

(73) Assignee: STMicroelectronics, Inc., Coppell, TX (US)

(*) Notice: Subject to any disclaimer, the term of this patent is extended or adjusted under 35 U.S.C. 154(b) by 1028 days.

(21) Appl. No.: 12/129,565

(22) Filed: May 29, 2008

(65) Prior Publication Data

US 2008/0298310 A1 Dec. 4, 2008

Related U.S. Application Data

(60) Provisional application No. 60/941,336, filed on Jun. 1, 2007.

(51) Int. Cl.
*H04W 4/00* (2009.01)
*H04W 36/00* (2009.01)
*H04W 72/00* (2009.01)
*H04J 3/06* (2006.01)

(52) U.S. Cl. ........ 370/328; 370/331; 370/338; 370/350; 455/432.1; 455/443; 455/450

(58) Field of Classification Search .................. None
See application file for complete search history.

(56) References Cited

U.S. PATENT DOCUMENTS

| | | | |
|---|---|---|---|
| 2004/0162920 A1* | 8/2004 | Topham | 710/5 |
| 2007/0105562 A1* | 5/2007 | Ji | 455/452.1 |
| 2007/0202816 A1* | 8/2007 | Zheng | 455/91 |
| 2007/0248076 A1* | 10/2007 | Ji et al. | 370/350 |
| 2008/0101308 A1* | 5/2008 | Gaur | 370/338 |
| 2008/0214199 A1* | 9/2008 | Ji | 455/452.1 |
| 2008/0253341 A1* | 10/2008 | Cordeiro et al. | 370/338 |
| 2008/0253347 A1* | 10/2008 | Cordeiro et al. | 370/343 |
| 2008/0259859 A1* | 10/2008 | Cordeiro et al. | 370/329 |
| 2009/0041003 A1* | 2/2009 | Challapali et al. | 370/350 |
| 2009/0323610 A1* | 12/2009 | Gaddam et al. | 370/329 |
| 2010/0020732 A1* | 1/2010 | Gaddam et al. | 370/310 |
| 2010/0061315 A1* | 3/2010 | Cordeiro | 370/329 |
| 2010/0067428 A1* | 3/2010 | Cordeiro et al. | 370/315 |
| 2010/0226358 A1* | 9/2010 | Cordeiro | 370/350 |

* cited by examiner

*Primary Examiner* — Ian N Moore
*Assistant Examiner* — Brian T Le
(74) *Attorney, Agent, or Firm* — Hogan Lovells US LLP

(57) ABSTRACT

A wireless system including a plurality of WRAN's operating on different channels identifies and addresses a number of important issues relating to the current CBP mechanism (in D0.3) used for inter-cell discovery and communication. The present invention provides fundamental remedies to respectively resolve these issues. Moreover, an Enhanced Coexistence Beaconing Protocol (CBP) is provided that allows efficient, scalable, and backward-compatible cross-channel inter-cell communications for IEEE 802.22 systems.

20 Claims, 15 Drawing Sheets

CBP FRAMING WITH
SLOTTED CBP WINDOWS

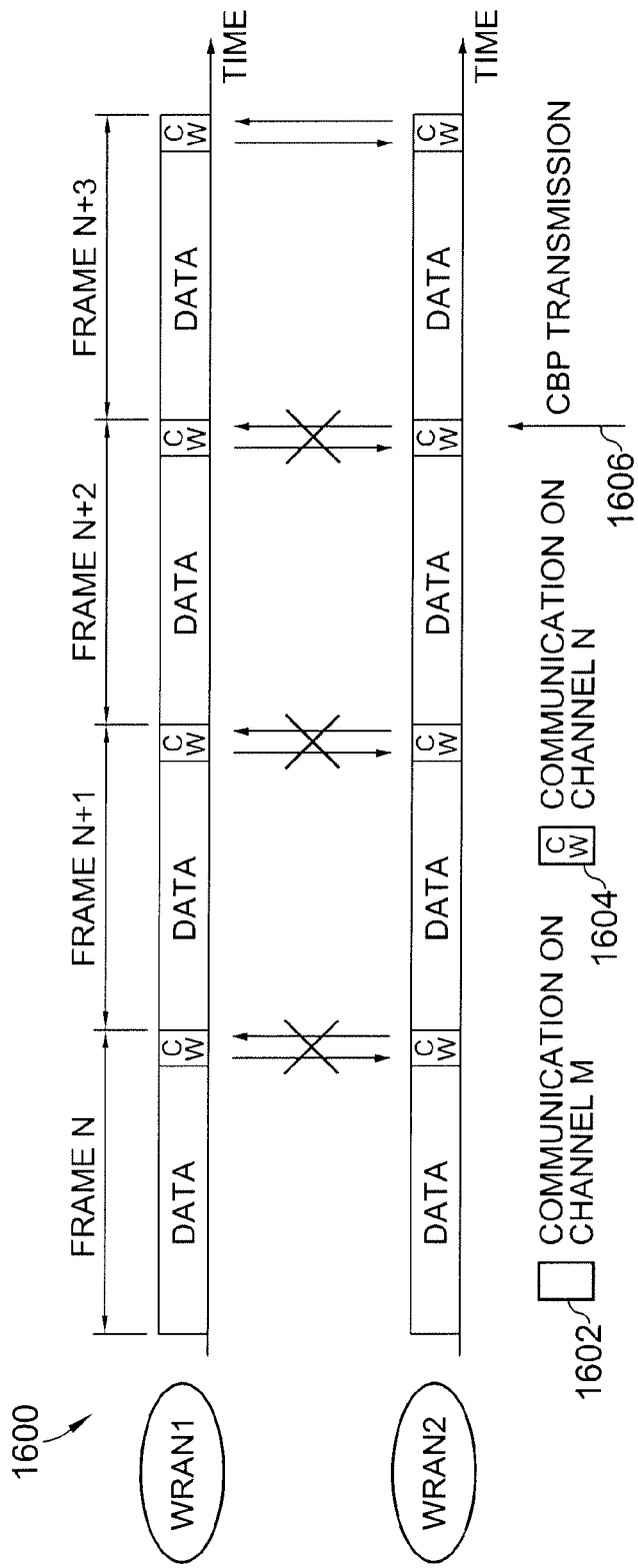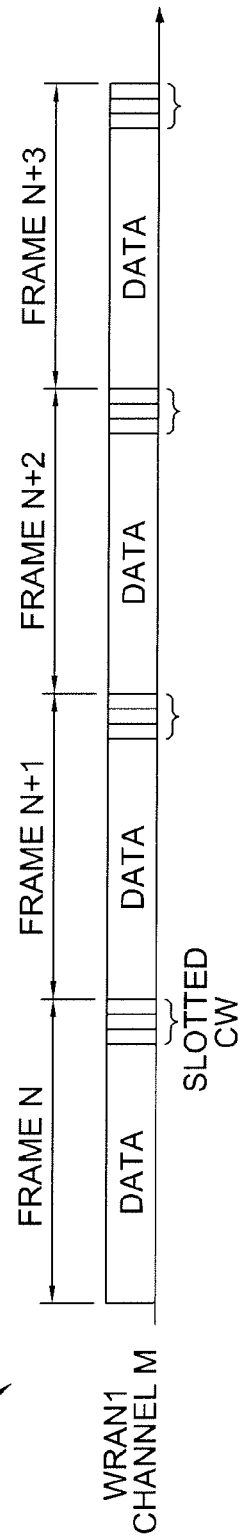
Fig. 16
Fig. 17

CBP FRAMING WITH
SLOTTED CBP WINDOWS

CROSS-CHANNEL INTER-CELL COMMUNICATIONS

CROSS CHANNEL COEXISTENCE BEACONING PROTOCOL FOR WIRELESS DYNAMIC SPECTRUM ACCESS NETWORKS

RELATED APPLICATION

The present application claims the benefit of U.S. Provisional Patent Application No. 60/941,336 filed Jun. 1, 2007, which is hereby incorporated in its entirety by reference for all purposes as if fully set forth herein.

BACKGROUND OF THE INVENTION

The present invention relates to wireless systems and, more specifically to an enhanced CBP ("Contention Based Protocol") mechanism that allows efficient, scalable, and backward-compatible cross-channel inter-cell communications for IEEE 802.22 systems.

A contention-based protocol (CBP) is a communications protocol for operating wireless telecommunication equipment that allows many users to use the same radio channel without pre-coordination. The "listen before talk" operating procedure in IEEE 802.11 is the most well known contention-based protocol.

Section 90.7 of Part 90 of the United States Federal Communication Commission rules define CBP as: "A protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel."

There are a number of important issues or problems that need to be more fully resolved regarding the current CBP mechanism used for inter-cell discovery and communication. A non-comprehensive list of the issues that need to be addressed is as follows:
  Directional Antenna at the CPE
  WRAN Cells Discovery and Detection
  Inter-Cell Communication Adjacent Channel Sensing
    Quiet Period Communication
  Inter-Cell Communication for Cross-Channel Spectrum Sharing What is proposed is a set of fundamental remedies to respectively resolve each of these issues. The nature of these issues and problems, as well as their solutions, will be described in greater detail below.

SUMMARY OF THE INVENTION

The present invention identifies and addresses a number of important issues relating to the current CBP mechanism (in D0.3) used for inter-cell discovery and communication. The present invention provides fundamental remedies to respectively resolve these issues. Moreover, an Enhanced Coexistence Beaconing Protocol (CBP) is provided that allows efficient, scalable, and backward-compatible cross-channel inter-cell communications for IEEE 802.22 systems.

An embodiment of the present invention is a wireless system including a first WRAN and a second WRAN having overlapping coverage areas, and a first CPE located in the overlapping coverage area and a second CPE located outside the overlapping coverage area, wherein the CPE in the overlapping coverage area comprises an omni-directional antenna or multiple directional antennas for effective CBP transmission. The first and second WRAN's further include a CBP packet for the announcement of the corresponding WRAN's existence on a certain channel that is periodically transmitted in a standardized deterministic time instance. The CBP packet is transmitted by a non-contention-based, collision-free, mechanism. The WRAN's further include a self-coexistence window that is synchronized across different channels. In the wireless system according to the present invention, hosting CBP packets for different channels are transmitted during the self-coexistence windows in a non-contention-based, collision-free, manner. Each of the WRAN's further include a super-frame that is synchronized across different channels. In the present invention quiet sensing periods of the first and second WRAN are synchronized and the first and second WRAN's operating on adjacent channels communicate to coordinate their quiet periods for incumbent detection. The first and second WRAN's operating on different channels also communicate to coordinate spectrum sharing activities. In the wireless system of the present invention at least one of the first and second WRAN's further include a slotted self-coexistence window (SCW) having two or more slots, each slot representing one OFDMA symbol. The SCW includes hosting, presentation, and discussion slots, wherein a reservation of the presentation slot expires at the end of a corresponding reservation life-time. The hosting slot provided by at least one of the first and second WRAN's is determined by modulo scheduling. The first and second WRAN's further include a CBP Frame including a group of CBP windows in consecutive data frames.

BRIEF DESCRIPTION OF THE DRAWINGS

The present invention is illustrated by way of example and not by limitation in the accompanying figures in which like reference numerals indicate similar elements and in which:

FIG. 16 is a timing diagram illustrating the problem of cross-channel CBP transmission according to the prior art;

FIG. 17 is a timing diagram of a slotted self-coexistence window (SCW) for a WRAN according to the present invention;

DETAILED DESCRIPTION

The CBP is a best-effort (contention based) protocol based on coexistence beacon transmissions. Coexistence beacons are transmitted during a contention window, called the Self Coexistence Window, at the end of an upstream sub-frame. CBP packets can be transmitted by CPEs ("Customer Premises Equipment" and BSs ("Base Station").

Figure 1:
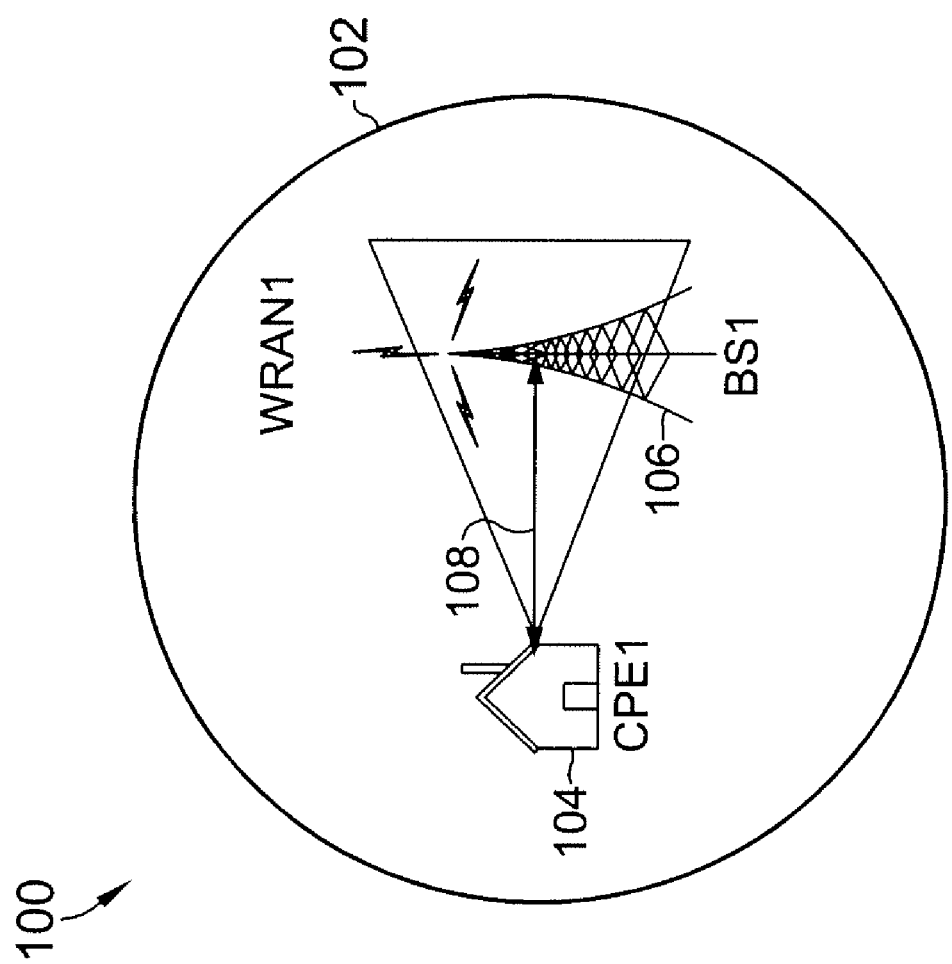
FIG. 1 is a diagram of a WRAN including a base station and a CPE having a directional antenna according to the prior art.

A first issue that is addressed by the present invention is the directional antenna at the CPE, as is explained in further detail below. Referring now to FIG. 1, a standard WRAN ("Wireless Regional Area Network") WRAN1 100 is shown having a coverage area 102. A CPE, CPE1 104 is shown in communication 108 with base station BS1 106. A directional antenna exists at the CPE 104 so that the two-way communication between the base station BS1 106 can be provided.

Figure 3:
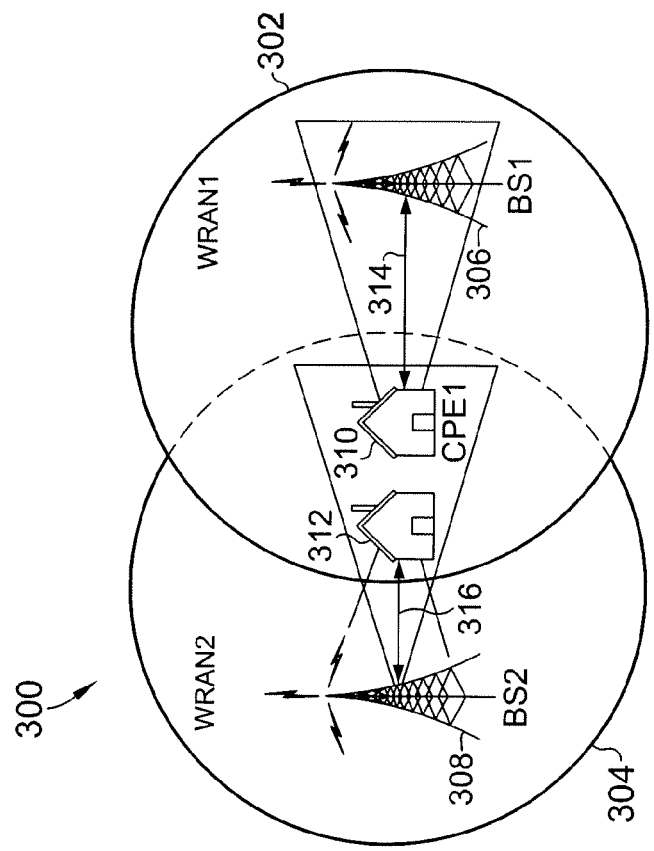
FIG. 3 is a diagram of two WRAN's in a "back-to-back" configuration having overlapping coverage areas, wherein both CPE's are in the overlapping coverage area according to the prior art.
Figure 2:
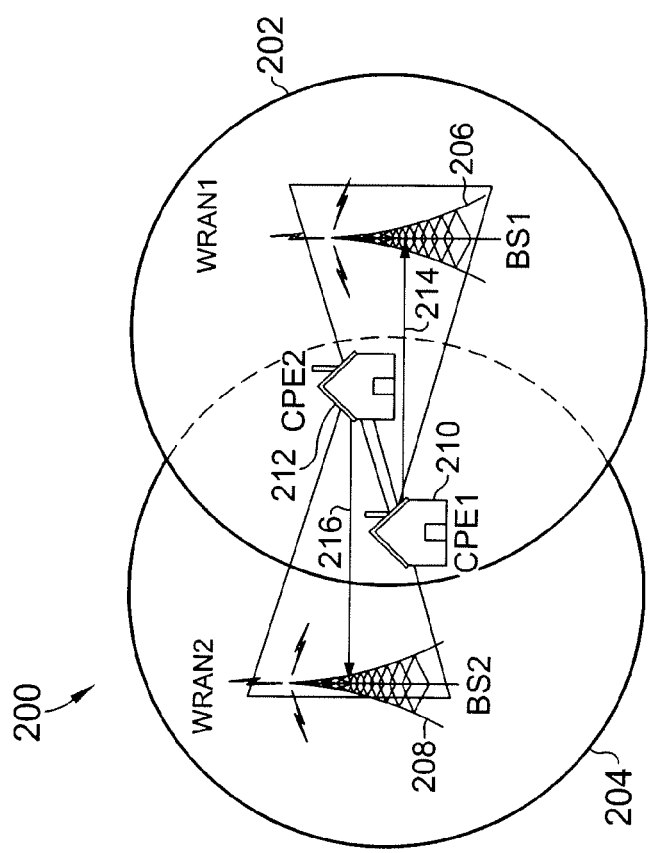
FIG. 2 is a diagram of two WRAN's in a "face-to-face" configuration having overlapping coverage areas, wherein both CPE's are in the overlapping coverage area according to the prior art.

CBP communications require neighbor-cell CPEs to exist as is shown in FIGS. 2 and 3. The "face-to-face CPEs" case is shown in FIG. 2. In FIG. 2, two WRANs overlap in space 200. A first WRAN1 has a coverage area 202 and a second WRAN2 has coverage area 204. Note that in FIG. 2 coverage areas 202 and 204 overlap, and that CPE1 210 and CPE2 212 are both in the overlap coverage area. CPE1 is in two-way communication 214 with BS1 206, and CPE2 is in two-way communication 216 with BS2 208. Beacons can be transmitted and received by the face-to-face CPEs CPE1 210 and CPE2 212 associated with different neighbor cells. The "back-to-back CPEs" case is shown in FIG. 3. In FIG. 3, two WRANs overlap in space 300. A first WRAN1 has a coverage area 302 and a second WRAN2 has coverage area 304. Note that in FIG. 3 coverage areas 202 and 204 also overlap, and that CPE1 310 and CPE2 312 are both in the overlap coverage area. CPE1 is in two-way communication 314 with BS1 206, and CPE2 is in two-way communication 316 with BS2 308. Beacons transmitted can also be received by CPEs CPE1 310 and CPE2 312 associated with the neighbor cells.

Figure 4:
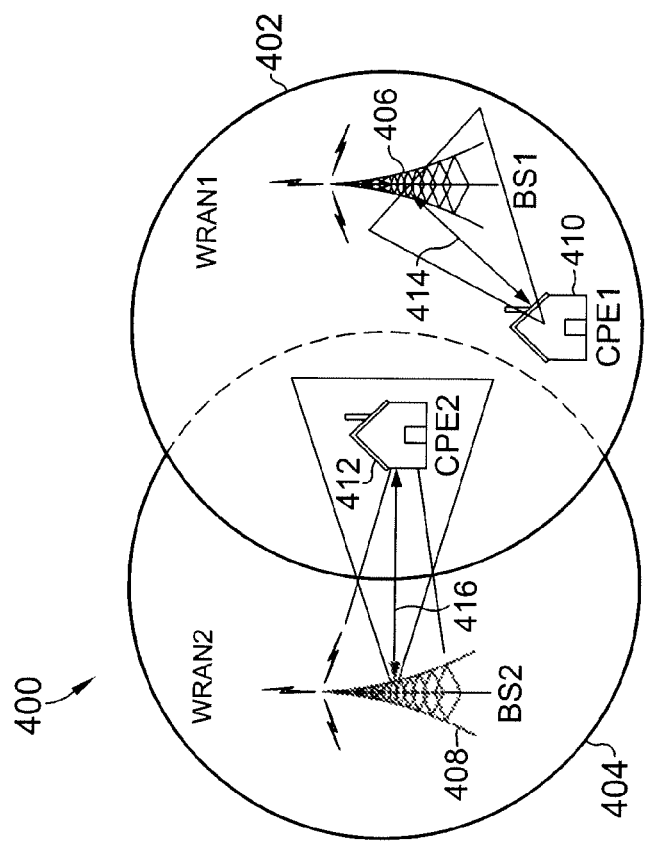
FIG. 4 is a diagram of two WRAN's in a failed CBP communication scenario having overlapping coverage areas, wherein only one of two CPE's is in the overlapping coverage area according to the prior art.

CBP communications fail without a neighbor-cell CPE as is shown in FIG. 4. In FIG. 4, two WRANs do not overlap in space 400. A first WRAN1 has a coverage area 402 and a second WRAN2 has coverage area 404. Note that in FIG. 4 coverage areas 402 and 404 overlap, and that only CPE2 412 is in the overlap coverage area. CPE1 is in two-way communication 414 with BS1 406, and CPE2 is in two-way communication 416 with BS2 408. Beacons from WRAN2 will never be received by WRAN1. Without knowing the existence of WRAN2, WRAN1 will interfere WRAN2's operation and sensing WRAN2 may decide to switch channel, which however may not be always possible.

Figure 5:
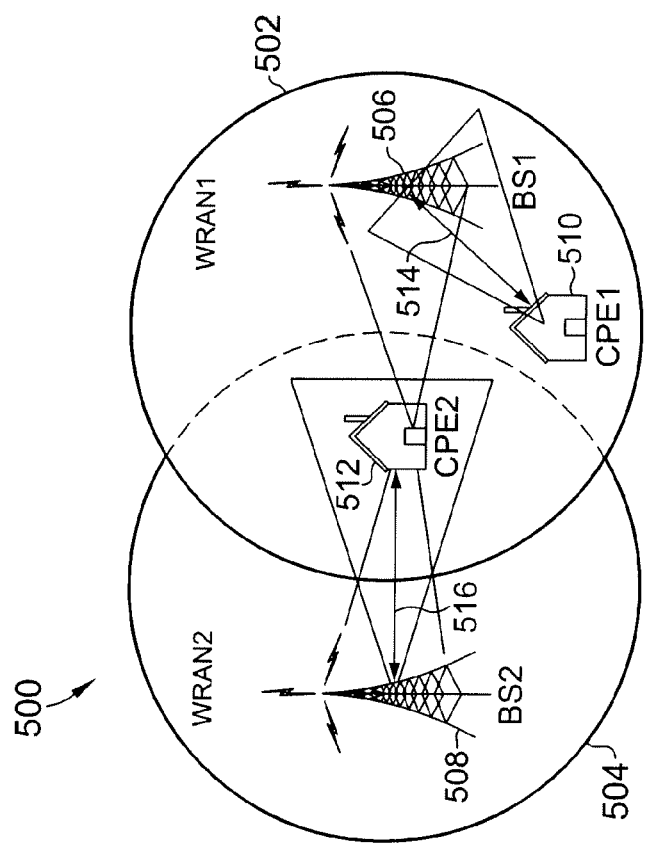
FIG. 5 is a diagram of two WRAN's in a CBP communication scenario having overlapping coverage areas, wherein only one of two CPE's is in the overlapping coverage area and employs an omnidirectional or multiple directional antennas according to the present invention.

A proposed remedy for the failed CBP communication situation shown in FIG. 4 is shown in FIG. 5. A first WRAN1 has a coverage area 502 and a second WRAN2 has coverage area 504. Note that in FIG. 5 coverage areas 502 and 504 overlap, and that only CPE2 512 is in the overlap coverage area, as in FIG. 4. CPE1 is in two-way communication 414 with BS1 406, and CPE2 is in two-way communication 416 with BS2 408. However, in FIG. 5 BS1 is also in communication with CPE2 because a second directional antenna is used. Therefore, to remedy the failed CBP communication situation shown in FIG. 4, the CPE in the cell-overlapping area (CPE2 in this case) shall employ an omni-directional antenna or multiple directional antennas for CBP transmission, if there exists no neighbor-cell CPE.

Figure 6:
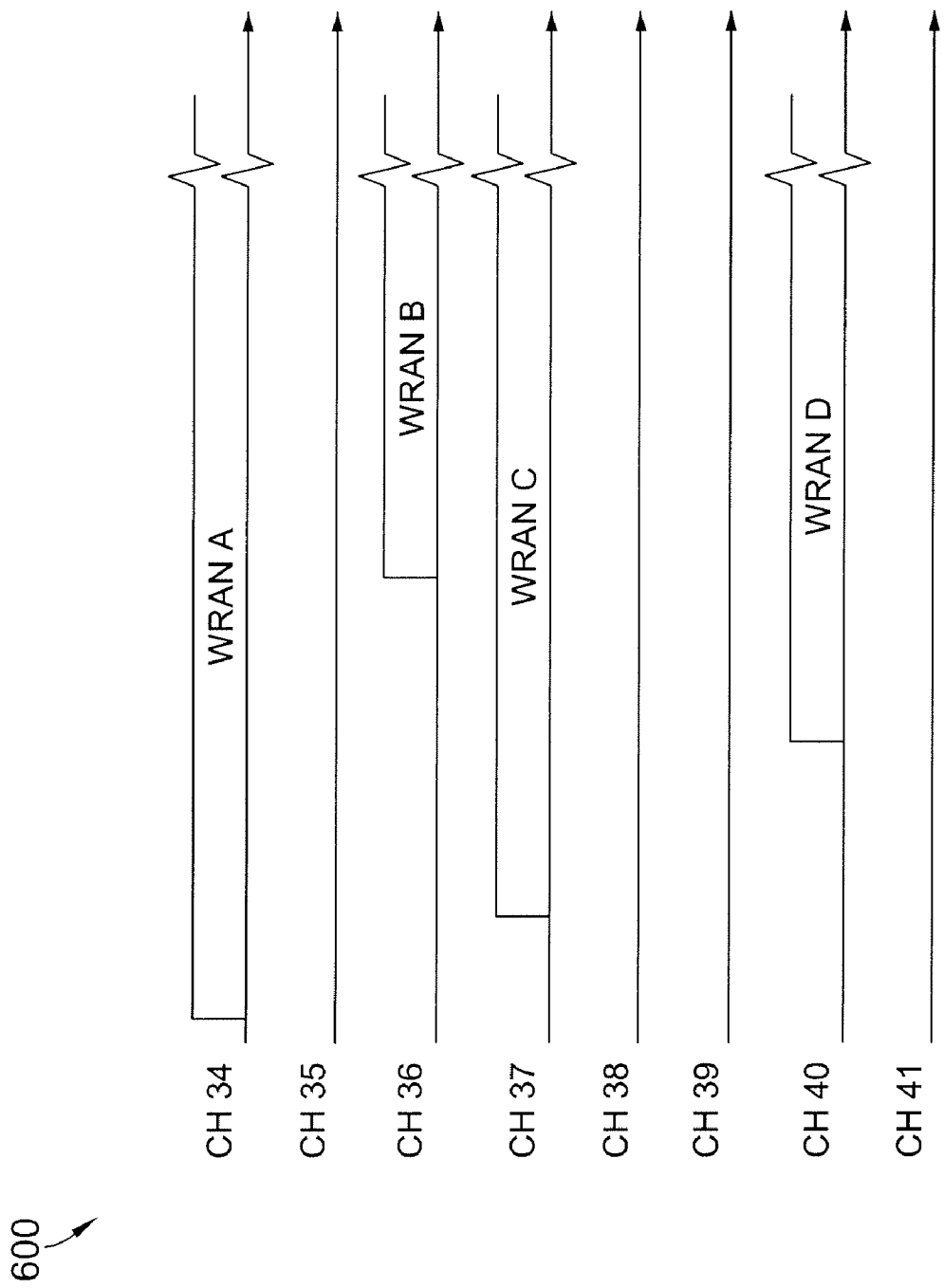
FIG. 6 is a timing diagram of four different WRAN's having CPB packets non-deterministically transmitted on four different channels.

A second issue addressed by the present invention is WRAN cells discovery and detection. CBP packets are transmitted in non-deterministic instances as is shown in FIG. 6. In FIG. 6, WRAN A broadcasts on Channel 34, WRAN B broadcasts on Channel 36, WRAN C broadcasts on Channel 37, and WRAN D broadcasts on Channel 40. Channels 35, 38, 39, and 41 are quiet. The CPEs of a cell would have to be continuously quiet for a number of super-frames to monitor CBP transmission for one single channel. A "super-frame" is defined as a predetermined number of single frames each containing data and a contention window as is described in further detail below. No more than four super-frames of waiting time are allowed as specified in the draft. The current mechanism leads to long delays and low system efficiency, especially when a set of channels need to be monitored during normal WRAN operation. A delay of 1.92 seconds for 3 channels (N±1) is specified in the draft.

A related issue addressed by the present invention is the latency of WRAN discovery. In the v0.3 draft—WRAN discovery takes no more than four super-frames. However, there is neither a specification nor a demonstration on how such latency is achieved. It is important to note that CBP is a contention-based best effort transmission protocol. Self-coexistence windows are scheduled where CBP packets from multiple neighbor cells are transmitted using a contention-based medium access mechanism. Collisions occur depending on the size of the contention window and the number of contending cells that are transmitting CBP packets. Latency of successful transmission is hard to manage and guarantee. It is more difficult if self-coexistence windows are not synchronized across neighbor WRAN cells.

A proposed remedy to address the WRAN cells discovery and detection issue is described below according to the present invention. A CBP packet for the announcement of a WRAN's existence on a certain channel shall be transmitted in a deterministic time instance, which shall be well-known (standardized) in IEEE 802.22. Such an announcement CBP packet shall be transmitted by a non-contention-based (collision-free) mechanism. IEEE 802.22 systems shall be able to complete the WRAN discovery process for a large set of channels in a reasonably small time scale. Self-coexistence windows shall be synchronized across different channels.

Figure 7:
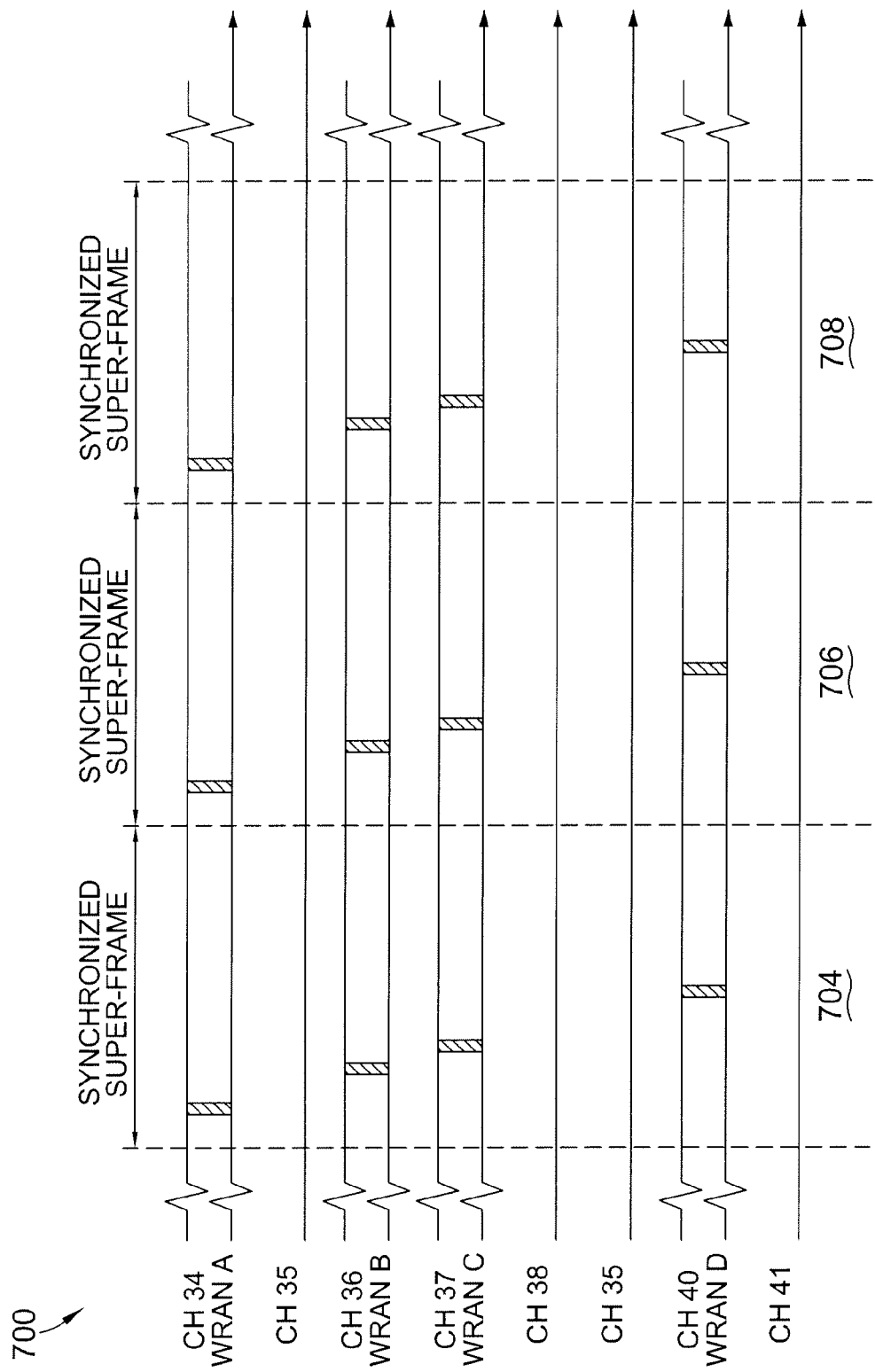
FIG. 7 is a channel hosting scenario wherein four different WRAN's operating on four different channels have synchronized super-frames according to the present invention.

The proposed remedy according to the present invention is referred to as "Channel Hosting" and is shown in FIG. 7. In FIG. 7, super-frames 704, 706, and 708 in space 700 are synchronized according to the present invention. Furthermore, a hosting CBP packet 702 is transmitted periodically in a deterministic time instance as is explained in further detail below. In FIG. 7 WRAN A broadcasts on Channel 34, WRAN B broadcasts on Channel 36, WRAN C broadcasts on Channel 37, WRAN D broadcasts on Channel 40, and Channels 35, 38, 39, and 41 are quiet. A CBP packet 702 for the announcement of a WRAN's existence on a certain channel—the hosting CBP packet—is transmitted periodically in a deterministic time instance, which is well-known in IEEE 802.22. The hosting CBP packets 702 for different channels are transmitted during the self-coexistence windows in a non-contention-based (collision-free) manner. IEEE 802.22 systems are able to complete the WRAN discovery process for a large set of channels (e.g. 32 channels or more) within one super-frame. Super-frames (therefore Self-coexistence windows) are synchronized across different channels. Further explanation of Channel Hosting according to the present invention are provided below.

A third issue addressed by the present invention is inter-cell communication for adjacent-channel sensing quiet period coordination. In draft version 0.3, the sensing quiet periods for incumbents detection are only required to be synchronized among WRAN cells that are operating on the same channel (through co-channel inter-cell communication). There is no specification on sensing quiet period coordination/synchronization for WRAN cells that are operating on the adjacent channels (i.e. N±1). However, it could be a serious issue that WRAN cells operate without such cross-channel synchronization, as shown below.

Figure 8:
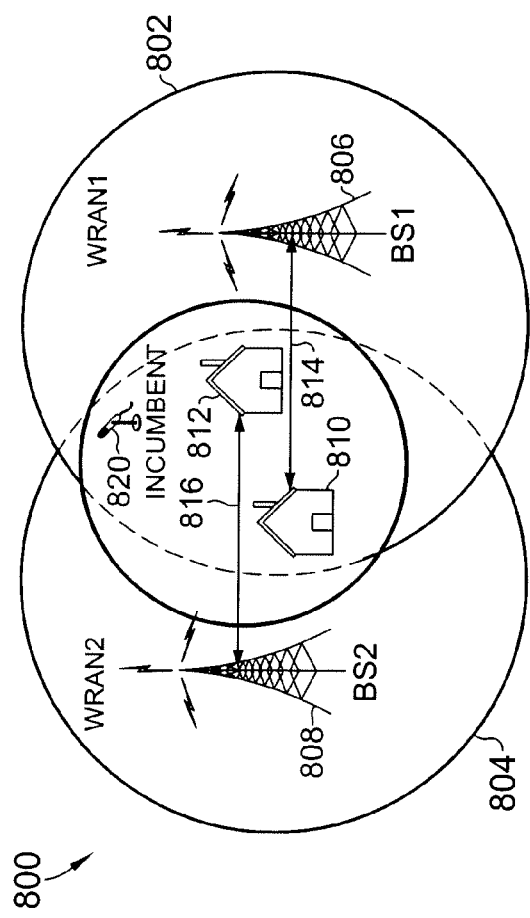
FIGS. 8 and 9 are related diagrams showing an incumbent interfering with the quiet sensing periods of a WRAN according to the prior art.
Figure 9:
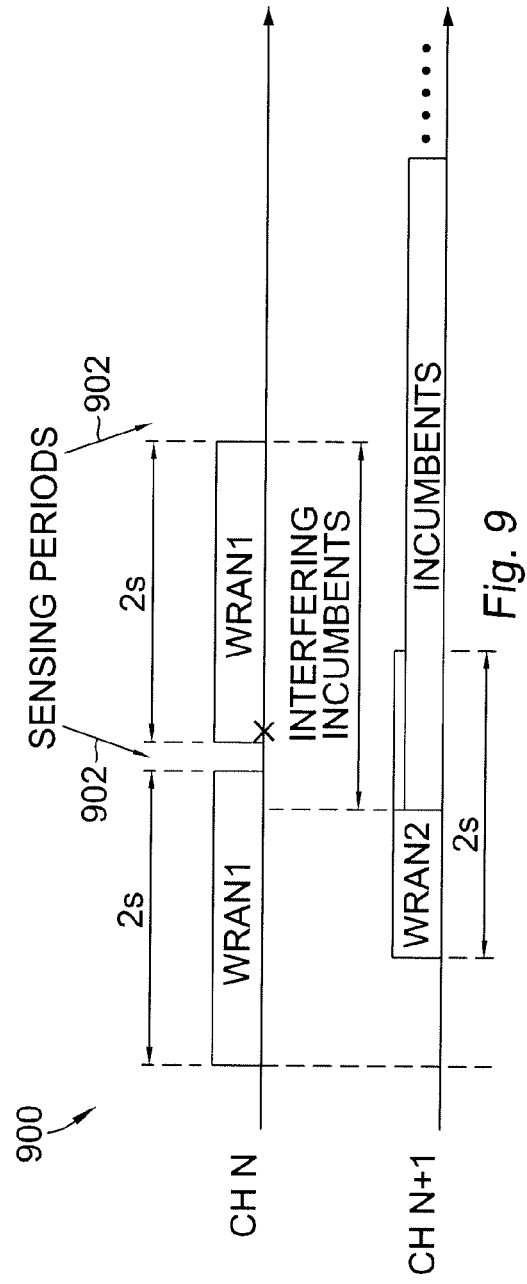

Referring now to FIG. 8, WRAN1 includes coverage area 802, wherein BS1 806 communicates 814 with CPE 810. WRAN2 includes coverage area 804, wherein BS2 808 communicates 816 with CPE 812. Note that both CPEs 810 and 812 are in the overlapping coverage areas 802 and 804, as well as that of incumbent 820. Non-coordinated adjacent-channel sensing can cause interference to "hidden" incumbents such as incumbent 802 for an intolerable period of time (violating the "FRD" or Function Requirement Document). This is shown in further detail in FIG. 9. In FIG. 9, a timing diagram 900 is shown for Channel N and Channel N+1. WRAN1 is broadcasting on Channel N and WRAN2 is broadcasting on Channel N+1. The incumbent 820 is also broadcasting on Channel N+1. Since the quiet sensing periods 902 are not synchronized, the interference caused by incumbent 820 can last for an intolerable period of time.

Figure 10:
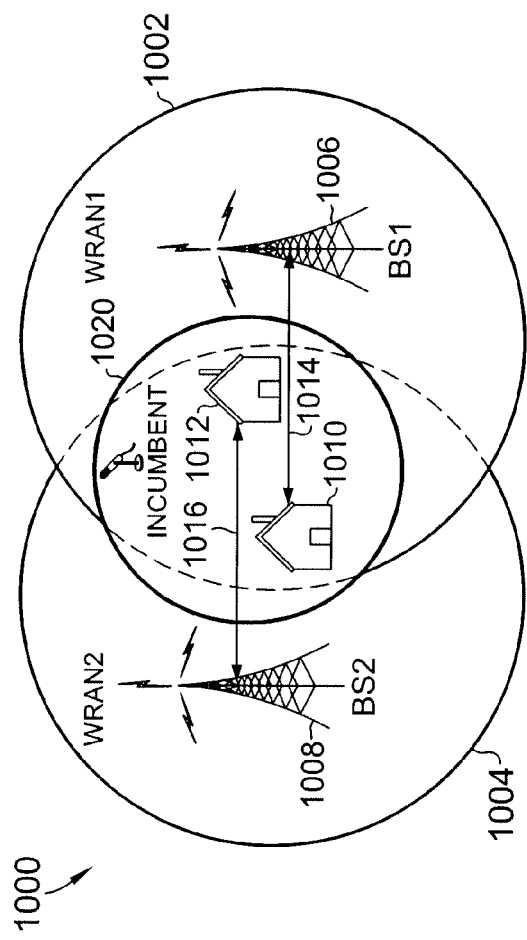
FIGS. 10 and 11 are related diagrams showing an incumbent interfering with the quiet sensing periods of a first and second WRAN according to the prior art.
Figure 11:
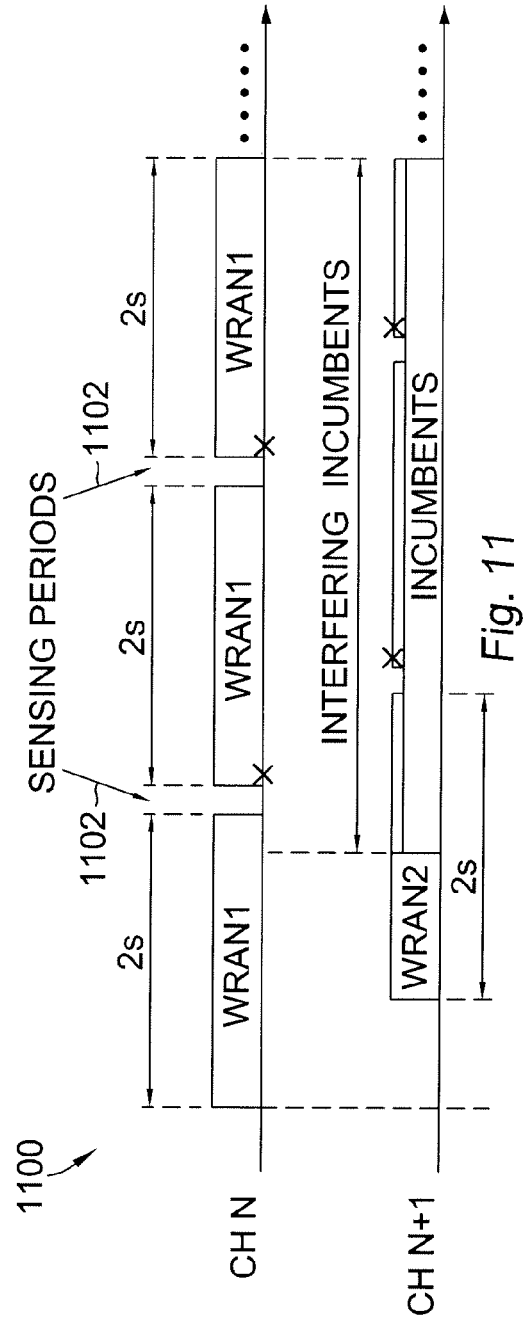

Referring now to FIG. 10, WRAN1 includes coverage area 1002, wherein BS1 1006 communicates 1014 with CPE 1010. WRAN2 includes coverage area 1004, wherein BS2 1008 communicates 1016 with CPE 1012. Note that both CPEs 1010 and 1012 are in the overlapping coverage areas 1002 and 1004, as well as that of incumbent 1020. More seriously than the situation shown in FIGS. 8 and 9, close-by CPEs operating on adjacent channels can interfere the sensing performance of a sensing CPE. This scenario can lead to interference to "hidden" incumbents for an ever longer period of time. This is shown in further detail in FIG. 11. In FIG. 11, a timing diagram 1100 is shown for Channel N and Channel N+1. WRAN1 is broadcasting on Channel N and WRAN2 is broadcasting on Channel N+1. The incumbent 1020 is also broadcasting on Channel N+1. Since the quiet sensing periods 1102 are not synchronized, the interference caused by incumbent 1020 can last for an ever longer period of time.

Figure 12:
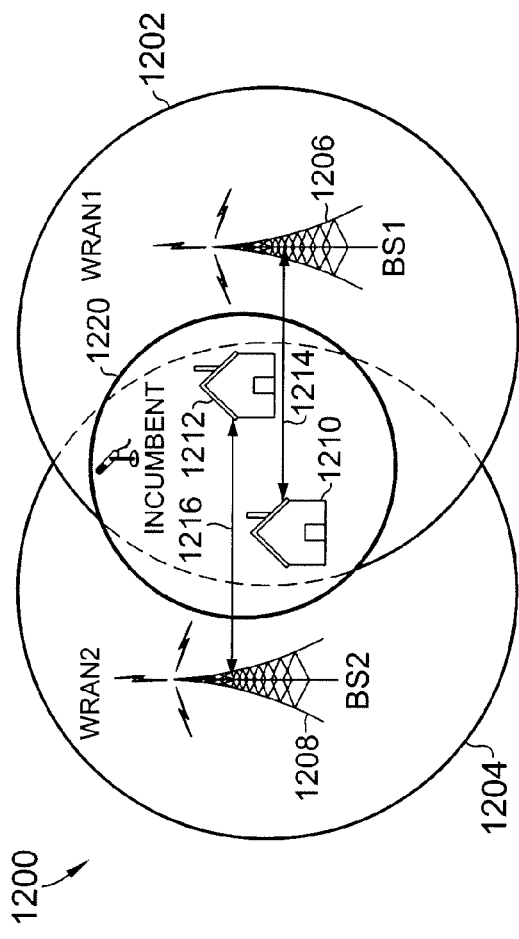
FIGS. 12 and 13 are related diagrams showing an incumbent interacting with first and second WRAN's having synchronized quiet periods according to the present invention.
Figure 13:
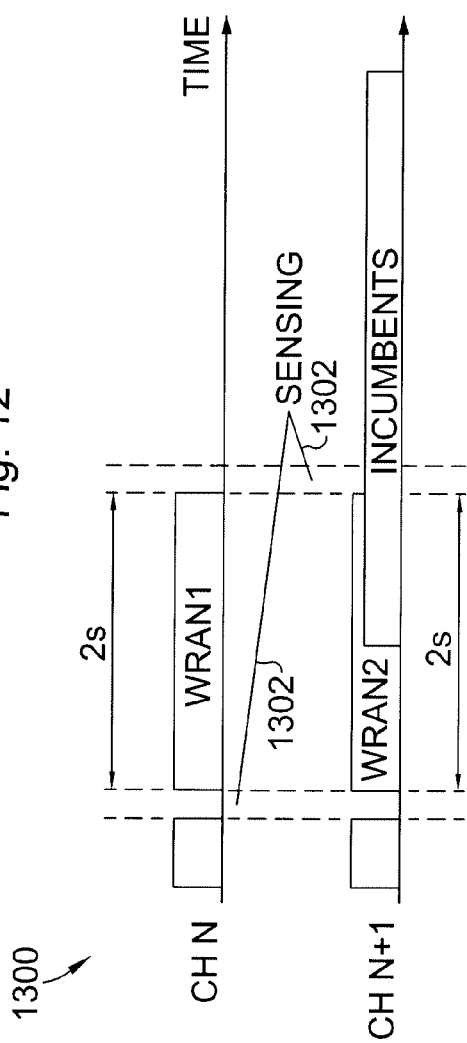

Referring now to FIG. 12, WRAN1 includes coverage area 1202, wherein BS1 1206 communicates 1214 with CPE 1210. WRAN2 includes coverage area 1204, wherein BS2 1208 communicates 1216 with CPE 1212. Note that both CPEs 1210 and 1212 are in the overlapping coverage areas 1202 and 1204, as well as that of incumbent 1220. In FIG. 13, a timing diagram 1300 is shown for Channel N and Channel N+1. WRAN1 is broadcasting on Channel N and WRAN2 is broadcasting on Channel N+1. The incumbent 1320 is also broadcasting on Channel N+1. Since the quiet sensing periods of WRAN1 and WRAN2 are synchronized, the interference caused by incumbent 1220 can be reasonably managed. Coordinated adjacent-channel sensing can avoid WRAN cells from interfering to "hidden" incumbents for an intolerable period of time.

A proposed remedy according to the present invention addresses inter-cell communication for adjacent-channel sensing quiet period coordination. WRAN cells operating on adjacent channels shall communicate to coordinate their quiet periods for incumbent detection. The quiet periods shall be synchronized by the operating WRAN cells on the adjacent channels.

A fourth issue addressed by the present invention is inter-cell communication for cross-channel spectrum sharing. In draft version 0.3, there is no mechanism specified that supports CBP-based inter-cell communication to be effectively performed across channels. We have shown the necessity of enabling cross-channel inter-cell communication for adjacent-channel quiet period synchronization. As is explained below, the above explained requirement for effective cross-channel communications also holds for cross-channel spectrum sharing.

Figure 14:
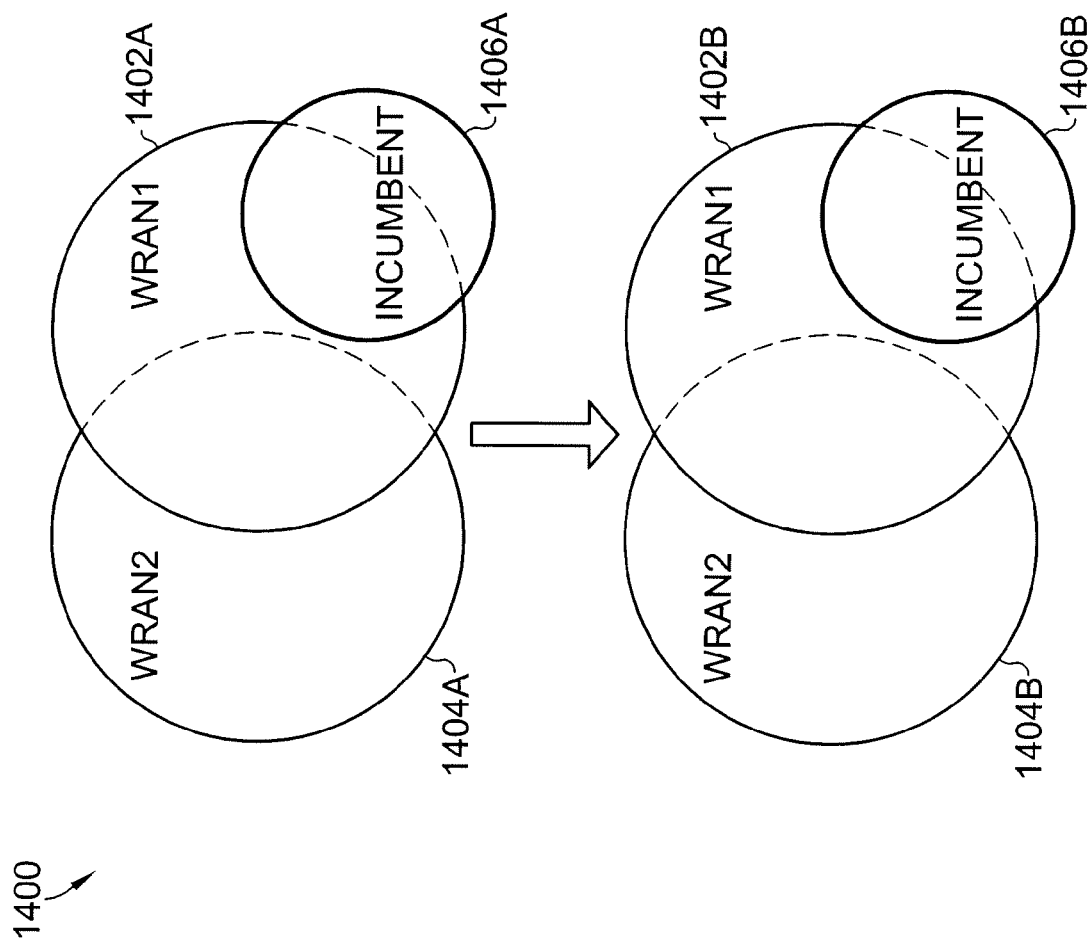
FIG. 14 illustrates the problem of spectrum sharing between first and second WRAN's upon the occurrence of an incumbent.

The issue of cross-channel spectrum sharing coordination is shown in FIG. 14. In FIG. 14, WRAN1 1402A operates on Channel M and WRAN2 1404A operates on Channel N. Channel M and N are the only vacant channels. When an incumbent 1406A pops up on channel M, WRAN1 1402A has to switch to and share channel N with WRAN2 1404A. For a smooth channel switching, it is desirable to coordinate the spectrum sharing between WRAN1 1402A and WRAN2 1404A before the channel switching of WRAN1 1402A from channel M to N takes place. The lower portion of FIG. 14 illustrates space 1400 after the channel switching takes place. The incumbent 1406B operates on channel M, and both WRAN1 1402B and WRAN2 1404B operate on channel N.

The proposed remedy for the issue of cross-channel spectrum sharing coordination is addressed by the present invention. WRAN cells operating on different channels shall communicate to coordinate their spectrum sharing activities. An effective cross-channel CBP mechanism shall be defined. The proposed remedy is set forth in greater detail below.

To resolve the four issues set forth above an enhanced cross-channel CBP is proposed according to the present invention. To resolve the issues of inter-cell discovery and inter-cell coordination using CBP, an enhancement to the current CBP is set forth that efficiently supports cross-channel communications. The following explanation presents the enhanced cross-channel CBP according to the present invention.

Figure 15:
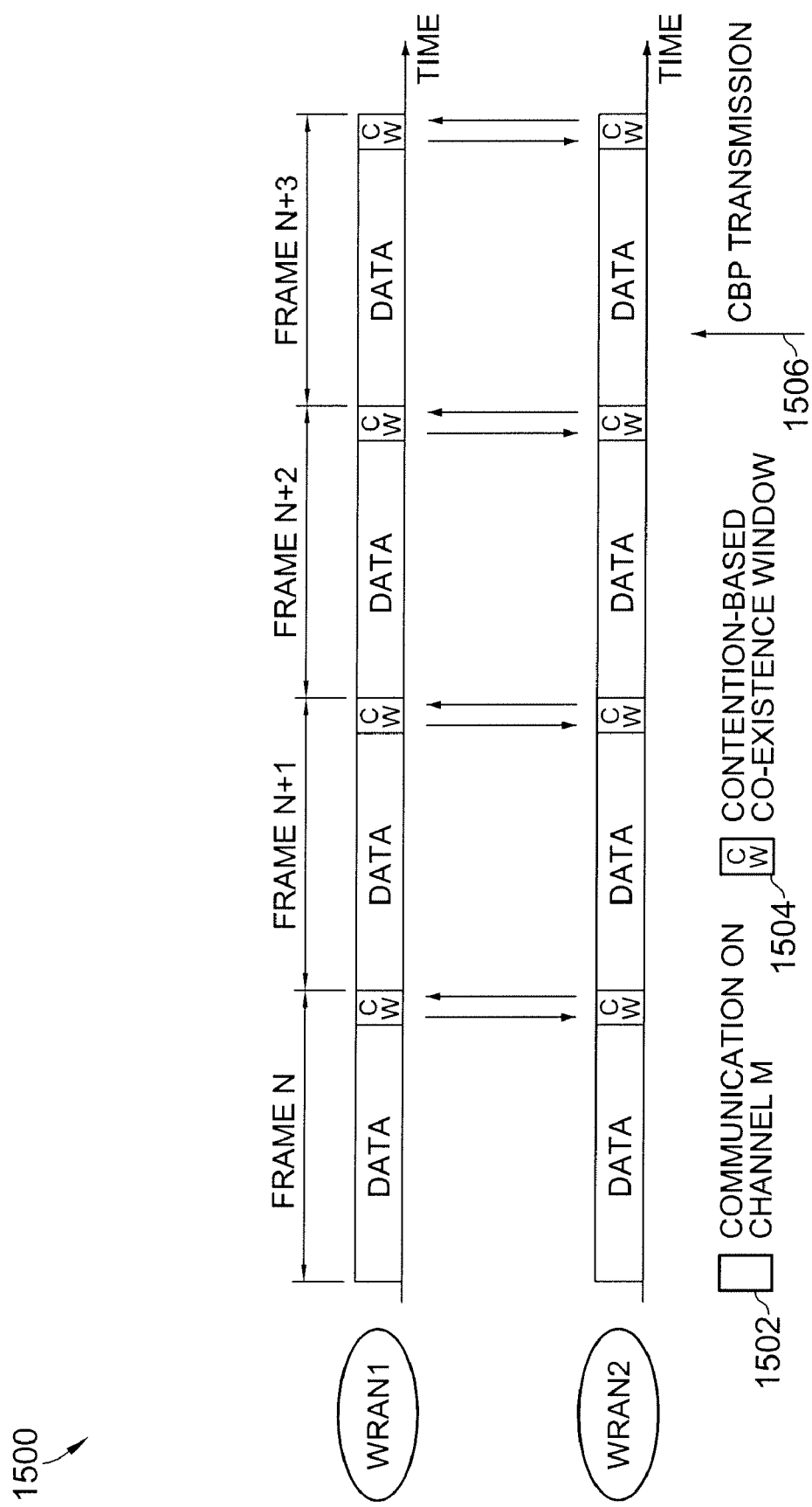
FIG. 15 is a timing diagram of single-channel CBP contention-based transmission according to the prior art.

A single channel CBP is illustrated in FIG. 15. The timing diagram 1500 of FIG. 15 illustrates WRAN1 and WRAN2 operating on the same channel. Each frame N, N+1, N+2, and N+3 includes communication data 1502 on channel M, a contention-based co-existence window 1504, and a CPB transmission 1506 between WRAN1 and WRAN2. WRAN cells on the same operating channel can transmit or receive CBP packets 1506 during the synchronized CWs (Co-existence Windows) using the best effort contention-based protocols to communicate with one another. An analogy to this type of communication could be thought of as professors sharing the same office and discussing topics with one another.

A problem with cross channel CBP is shown in FIG. 16. The timing diagram 1600 of FIG. 16 shows WRAN1 operating on channel M and WRAN2 operating on channel N. Each frame N, N+1, N+2, and N+3 includes communication data 1602 on channel M, communication data 1604 on channel N, and no CPB transmission 1606 between WRAN1 and WRAN2. The reason that there is no CPB transmission between WRAN1 and WRAN2 in the example of FIG. 16 is that the CWs are on different channels. In the example of FIG. 16 a CW for WRAN1 is operating on channel M while a CW for WRAN2 is operating on channel N, and vice versa. Similar to the single-channel CBP operation, during a CW, the CBP-participating CPEs of a WRAN can either stay on their operating channel or tune to another channel occupied by a neighboring WRAN cell. Communications between two neighboring cells can succeed only when at least two CBP-participating CPEs from each cell are tuned to the same channel during a CW where one of them is transmitting and the other is receiving. An analogy of the cross channel CPB problem could be University professors visiting one another's offices in a non-deterministic manner (asynchronously). The communication may or may not take place in this situation.

To address the issue of effective cross channel CPB, a slotted self-coexistence Window (SCW) is proposed according to the present invention. Instead of being utilized as contention windows, SCWs are slotted. Each slot is one OFDMA symbol. A typical size of a slotted CBP window is three slots. The advantage of CBP window slotting is to enable efficient management of CBP communications. A SCW is shown in FIG. 17 wherein WRAN1 operates on channel M, and each frame N through N+3 contains data followed by a slotted CW.

A more detailed explanation for channel hosting shown in FIG. 7 is given below. A CBP packet for the announcement of a WRAN's existence on a certain channel—the hosting CBP packet—is transmitted periodically in one of the SCW slots, whose time instance and duration are well-known in IEEE 802.22. The well-known position of the hosting slot can be determined by Modulo Scheduling. For example, the slot number (in every super-frame) is equal to the first slot of Frame {"Channel-Number" mod 16}. The time to discover one channel using modulo scheduling is equal to one symbol duration versus 640 ms required by the current CBP mechanism. This is a significant improvement. Therefore, the hosting CBP packets for different channels are transmitted during the self-coexistence windows in a non-contention-based (collision-free) manner. A WRAN cell is able to complete the WRAN discovery process for a large set of channels (almost all channels) within one super-frame. There are a few channels that use the same slot position for channel hosting as the one being used by the discovering WRAN. We refer to this situation as "concurrent hosting". Since frequency separation is very large (e.g. 16×6 MHz), concurrent hosting should be feasible between neighbor cells.

Figure 18:
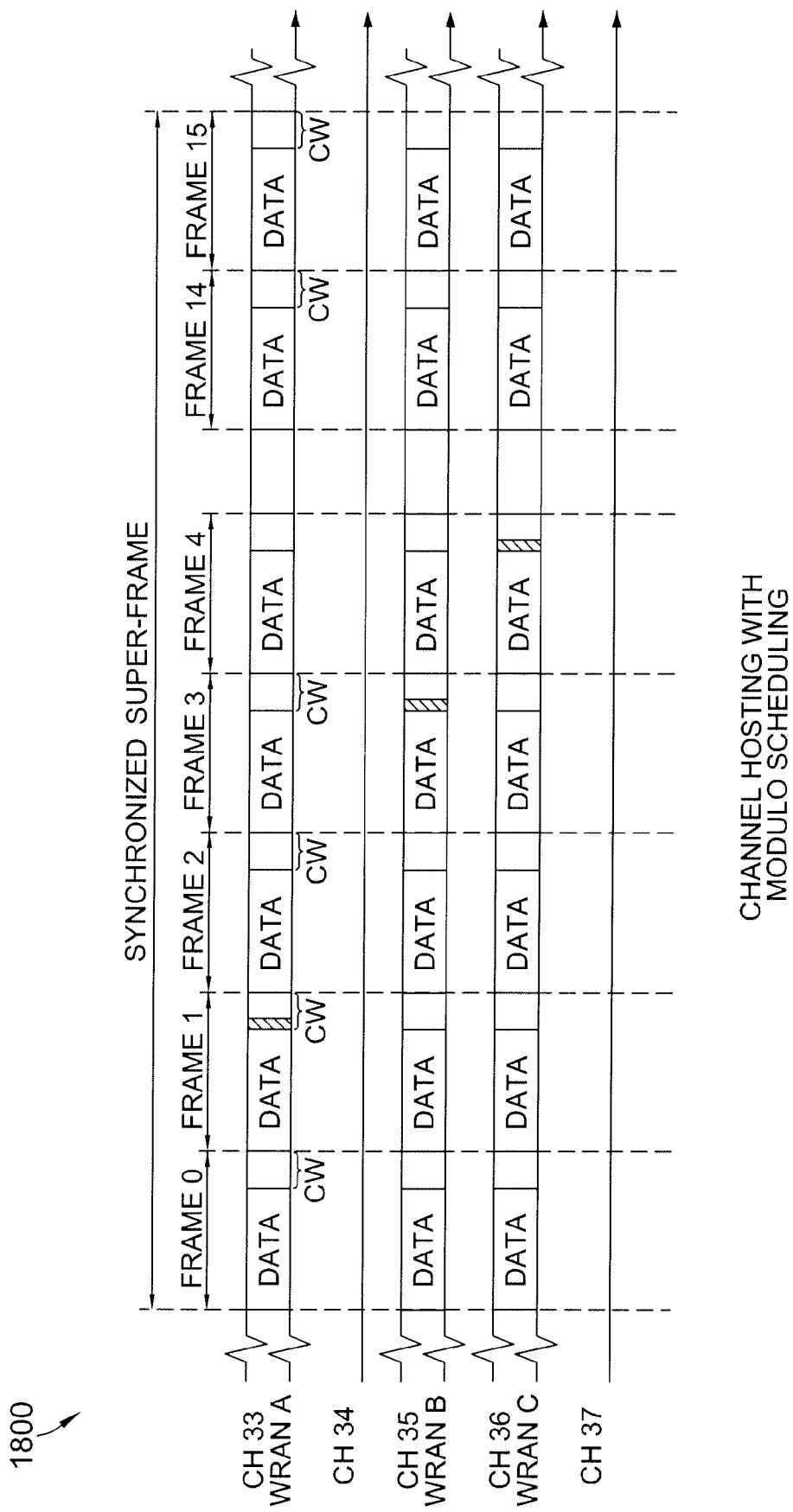
FIG. 18 is a timing diagram of channel hosting with modulo scheduling for a plurality of WRAN's according to the present invention.

An example of Channel Hosting using Modulo Scheduling is shown in the timing diagram 1800 of FIG. 18. In FIG. 18 WRAN A operates on channel 33, WRAN B operates on channel 35, and WRAN C operates on channel 36. Channels 34 and 37 are quiet. Using the slot number equation proposed above, the CPB packet for WRAN A appears in Frame 1, the CPB packet for WRAN B appears in Frame 3 and the CPB packet for WRAN C appears in Frame 4. Each CPB packet is in the first position of the CW for each frame.

Figure 19:
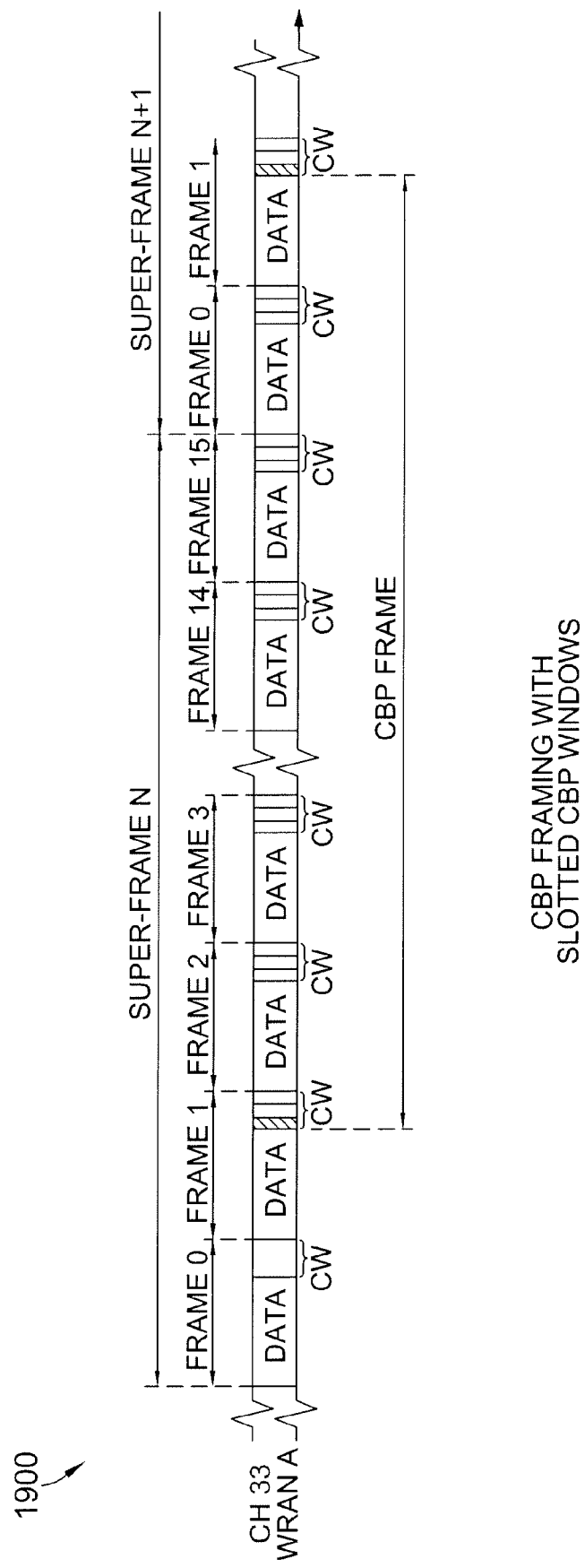
FIG. 19 is a timing diagram of CBP framing with slotted CBP windows according to the present invention.

CBP Framing, which is yet another aspect of the enhanced cross-channel CBP proposed according to the present invention is explained below. CBP Framing provides a scalable management mechanism for cross-channel CBP-based inter-cell communication. A CBP Frame is a group of CBP windows in sixteen consecutive data frames, and is piloted with a Hosting Beacon in a Hosting Slot. Similar to a regular data frame, a CBP frame consists of a MAP and the Payload. The MAP of a CBP frame is carried by the Hosting Beacon, and specifies the payload in the CBP frame. The Payload is the SCW slots scheduled by the MAP in the CBP Frame. An example of CBP framing is shown in the timing diagram 1900 of FIG. 19. WRAN A operates on channel 33, wherein frames 0-15 are shown. Each frame includes data and slotted CW windows. Super-frame N includes the first occurrence of frames 0-15, and Super-frame N+1 is shown to include the next occurrence of frames 0-15. The CBP frame is shown starting at the CW of frame 1 and ending at the CW of the next occurring frame 1. The CBP frame is defined in the manner shown in FIG. 19 by way of an example.

Figure 20:
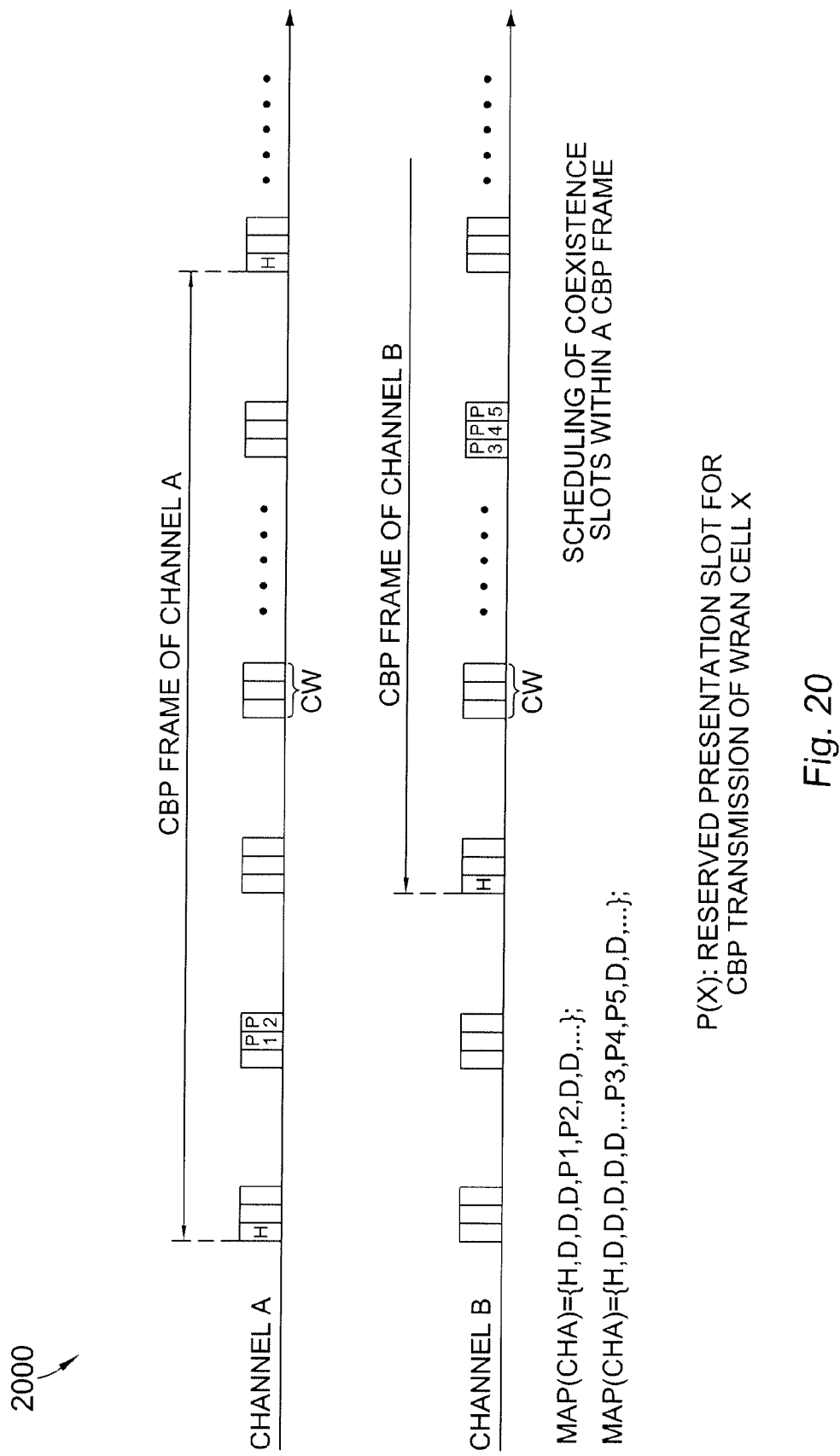
FIG. 20 is a timing diagram related to scheduling of SCW slots in a CBP frame according to the present invention.

The scheduling of SCW Slots in a CBP Frame according to the present invention is explained below. There are three types of slots in a CBP frame: Hosting, Presentation, and Discussion. A Hosting (or announcement) slot (H) is reserved for the transmission of the Hosting CBP packet. The hosting slot is always at the beginning of a CBP frame. The hosting slot contains information of channel hosting and SCW slot scheduling (MAP), which can received by WRAN cells on every channel. A Presentation (or reservation) slot (P) is reserved for a WRAN cell to perform contention-free CBP packet transmission. Other WRAN cells can receive the packet during this slot. Each WRAN cell can reserve its own P slot. A Discussion (or contention/free-to-talk) slot (D) is used for contention-based inter-cell communication and regular WRAN system maintenance (CBP based ranging, etc.). The scheduling of SCW slots in a CBP frame according to the present ensure backward compatibility with the current CBP mechanism. This is because the current CBP mechanism is already contention-based. The Scheduling of SCW Slots in a CBP Frame is shown in the timing diagram 2000 of FIG. 20. The hosting slot (H) is shown for both Channel A and Channel B in the corresponding CBP frames. Reserved presentation slots (P) for CBP transmission of WRAN cells for both Channel A and Channel B are also shown in FIG. 20.

Reservation life-time of a presentation slot, which is yet another aspect of the enhanced cross-channel CBP proposed according to the present invention is explained below. To prevent a WRAN cell from holding a presentation slot, a reservation life-time of the presentation slot shall be initialized. The reservation of the presentation slot of a WRAN on a Channel expires at the end of a corresponding reservation life-time. Typically the life-time is equal to a pre-determined number of super-frames. After the life-time is expired, the presentation slot of a WRAN is removed.

Finally, the cross-channel inter-cell communication according to the present invention is set forth in the steps below and in the block diagram of FIG. 21.

A WRAN cell "A" is to receive CBP packets from WRAN cell "B". Tune to the operating channel of WRAN B—Ch (B)—during the hosting slot of Ch(B). Receive and decode the CBP frame MAP of Ch(B)—H(B). Identify the presentation slot of WRAN B—P(B). If P(B) exists, receive CBP packets from WRAN B at slot P(B). If P(B) does not exist, try to receive CBP packets from WRAN B during the discussion slots on Ch(B).

A WRAN cell "A" is to transmit CBP packets to WRAN "B". If a presentation slot is required for the CBP packet transmission, reserve one—P(A). Transmit the CBP frame MAP—H(A)—on its operating channel—Ch(A)—during the hosting slot of Ch(A). If there is presentation slot—P (A)—reserved for WRAN A, transmit the CBP packet during P(A). If no presentation slot exists, transmit the CBP packet during the discussion slot on Ch(A).

Figure 21:
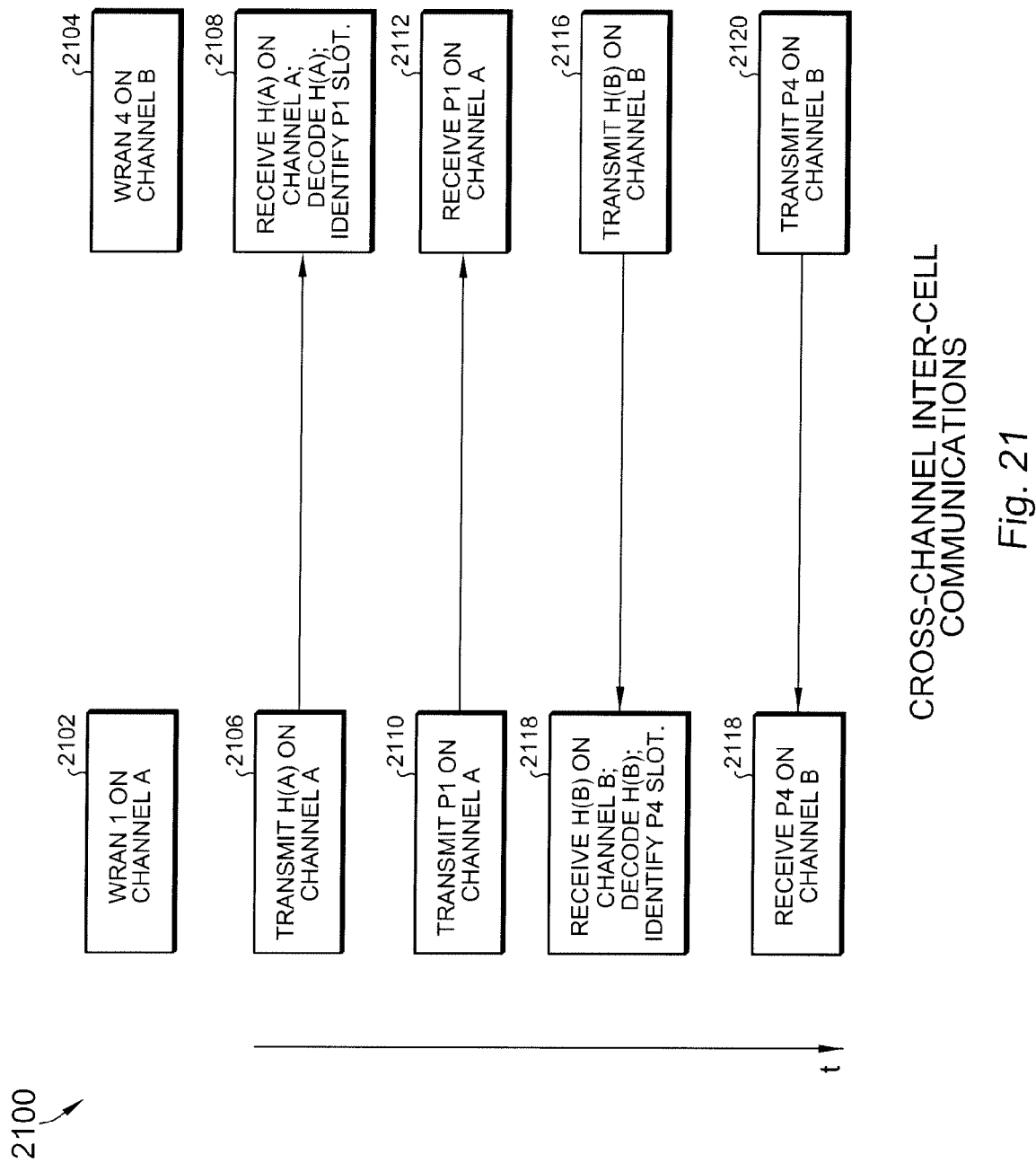
FIG. 21 is a flow chart for cross-channel inter-cell communications according to the present invention.

Referring now to the flow chart 2100 of FIG. 21, a WRAN1 operates on Channel A at block 2102. A WRAN4 operates on Channel B at block 2104. WRAN1 transmits the hosting slot H(A) on Channel A at block 2106. WRAN4 receives the hosting slot H(A) on Channel A, decodes the hosting slot H(A), and identifies a presentation slot P1 at block 2108. WRAN1 transmits presentation slot P1 on Channel A at block 2110. WRAN4 receives presentation slot P1 on Channel A at block 2112. WRAN4 transmits a hosting slot H(B) on Channel B at block 2116. WRAN1 receives the hosting slot H(B) on Channel B, decodes the hosting slot H(B), and identifies a presentation slot P4 at block 2114. WRAN4 transmits the presentation slot P4 on Channel B at block 2120, and finally WRAN1 receives the presentation slot P4 on Channel B at block 2118.

The present invention identifies and addresses a number of important issues relating to the current CBP mechanism (in D0.3) used for inter-cell discovery and communication. The present invention provides fundamental remedies to respectively resolve these issues. Moreover, an Enhanced Coexistence Beaconing Protocol (CBP) is provided that allows efficient, scalable, and backward-compatible cross-channel inter-cell communications for IEEE 802.22 systems.

Once the protocol has been updated according to the present invention, it can be implemented in the MAC (Medium Access Control) layer via software as an upgrade to an existing protocol or implemented in a new system.

Having described and illustrated the principle of the invention in a preferred embodiment thereof, it is appreciated by those having skill in the art that the invention can be modified in arrangement and detail without departing from such principles. Although a preferred method has been shown, the exact details of the preferred method can be changed as desired as required for a particular application. We therefore claim all modifications and variations coming within the spirit and scope of the following claims.

I claim:

1. A method of operating a system of Wireless Regional Area Networks (WRANs) comprising:
    grouping of a fixed number, FN, of successive transmission frames into superframes;
    synchronization of a transmission of the superframes, wherein the synchronization of the transmission of the superframes occurs across frequency channels in use within the WRAN system;
    assigning to each frequency channel in use by the WRAN system of a unique number, determined by a formula [(channel number) mod FN], which designates for that channel an internal frame number within each superframe during which the channel shall use that specific internal frames's coexistence window, called a Coexistence Beacon Window (CBW), to transmit a coexistence beacon, with any WRAN in the WRAN system on a different channel operating only to receive during a transmission time of the coexistence beacon within the CBWs assigned to other channels; wherein
    a subdivision of the CBW to have a plurality of transmission slots, such a slotted CBW called a Slotted Coexistence Beaconing Window (SCBW).

2. The method of claim 1, wherein all WRANs within the WRAN system further synchronize quiet periods of all the WRANs for sensing of incumbent channel users, and use the synchronized quiet periods to sense system channels for incumbent users.

3. The method of claim 1, wherein a number of frames, FN, in each super frame is 16.

4. The method of claim 1, wherein a first slot of the SCBW, called a hosting slot, is used to transmit a hosting beacon.

5. The method of claim 1, wherein the SCBW comprises at least three slots, with each slot being one OFDMA symbol.

6. The method of claim 5, wherein the first slot of the SCBW is used to transmit the hosting beacon, and may be used to transmit information to make reservations for contention-free transmissions during slots other than the first slots, called presentation slots, of later SCBWs of channels not in use within the WRAN system.

7. The method of claim 6, wherein a third slot, and unreserved slots of later SCBWs of channels not in use within the WRAN system, are used for contention based inter-cell communication and regular WRAN system maintenance.

8. The method of claim 7, wherein a reservation lifetime of a reserved presentation slot is initialized to be a number of superframes, so that after an expiration of the reservation lifetime, the reserved presentation slots are returned to a status of contention-based slots.

9. A system of WRANs with overlapping service areas, comprising:
    a plurality of base stations;
    a plurality of Consumer Premise Equipment (CPE) devices, in communication with the base stations, with either an omnidirectional antenna, or a sufficient number of directional antennas, to detect all WRAN base stations within the system of WRANs; and;
    a transmission protocol for communication between the CPE devices and the base stations;
    wherein the transmission protocol comprises:
    grouping a fixed number, FN, of successive transmission frames into superframes;
    synchronization of a transmission of the superframes, wherein the synchronization of the transmission of the superframes occurs across the frequency channels in use within the WRAN system;
    assigning to each frequency channel in use by the WRAN system of a unique number, determined by a formula [(channel number) mod FN], which designates for that channel an internal frame number within each superframe during which a WRAN using the channel shall use that specific internal frames's coexistence window, called a Coexistence Beacon Window (CBW), to transmit a coexistence beacon, during which any WRAN in the system of WRANs on a different channel operates only to receive during a transmission time of the coexistence beacon within the CBWs assigned to other channels; wherein
    a subdivision of the CBW to have a plurality of transmission slots, such a slotted CBW called a Slotted Coexistence Beaconing Window (SCBW).

10. The system of claim 9, wherein all WRANs within the system of WRANs further synchronize quiet periods of all the WRANs for sensing of incumbent channel users, and use the synchronized quiet periods to sense system channels for incumbent users.

11. The system of claim 9, wherein a number of frames, FN, in each superframe is 16.

12. The system of claim 9, wherein a first slot of the SCBW, called a hosting slot, is used to transmit a hosting beacon.

13. The system of claim 9, wherein the SCBW comprises at least three slots, with each slot being one OFDMA symbol.

14. The system of claim 13, wherein the first slot of the SCBW is used to transmit the hosting beacon, and may be used to transmit information to WRANs on other channels to make reservations for contention-free, interchannel communications during slots other than the first slots, called presentation slots, of later SCBWs not in use within the WRAN system.

15. The system of claim 14, wherein a third slot, and unreserved slots of later SCBWs of channels not in use within the system of WRANs, are used for contention-based intercell communication and regular WRAN system maintenance.

16. The system of claim 15, wherein a reservation lifetime of a reserved presentation slot is initialized to be a number of superframes, so that after an expiration of the reservation lifetime, the reserved presentation slots are returned to a status of contention-based slots.

17. A method of cross-channel, intercell, communication of WRANs, comprising:

employing a transmission protocol comprising:

grouping of a fixed number, FN, of successive transmission frames into superframes;

synchronization of a transmission of the superframes, wherein the synchronization of the transmission of the superframes occurs across frequency channels in use within a WRAN system;

assigning to each frequency channel in use by the WRAN system of a unique number, determined by a formula [(channel number) mod FN], which designates for that channel an internal frame number within each superframe during which a WRAN using the channel shall use that specific internal frames's coexistence window, called a Coexistence Beacon Window (CBW), to transmit a coexistence beacon, with any WRAN in the WRAN system on a different channel operating only to receive during a transmission time of the coexistence beacon within the CBWs assigned to other channels; wherein a subdivision of the CBW to have a plurality of transmission slots, such a slotted CBW called a Slotted Coexistence Beaconing Window (SCBW);

wherein a first slot of the SCBW, called a hosting slot, is used to transmit a hosting beacon;

wherein the hosting beacon may be used to transmit information to WRANs on other channels to make reservations for contention-free, interchannel communications during slots other than the hosting slots, called presentation slots, of later SCBWs not in use within the WRAN system;

and wherein intercell communication between cells of the WRAN system proceeds by a first WRAN transmitting in the hosting slot of its SCBW a reservation for a presentation slot in later SCBW, a second WRAN receiving that transmission and identifying and reserving the presentation slot for later reception, the first WRAN transmitting information to the second WRAN during that later presentation slot, the second WRAN receiving the transmission in that presentation slot, the second WRAN transmitting in the hosting slot of its own channel's SCBW a reservation for a presentation slot in a later SCBW, the first WRAN receiving the transmission and identifying and reserving the later presentation slot for reception from the second WRAN, and the second WRAN transmitting information to the first WRAN in the later presentation slot, and the first WRAN receiving that information.

18. The method of claim 17, wherein a number of frames, FN, in each superframe is 16.

19. The method of claim 17, wherein the SCBW comprises at least three slots, with each slot being one OFDMA symbol.

20. The system of claim 17, wherein a reservation lifetime of a reserved presentation slot is initialized to be a number of superframes, so that after an expiration of the reservation lifetime, the reserved presentation slots are returned to a status of contention-based slots.

* * * * *